United States Patent
Toft et al.

(10) Patent No.: US 7,767,051 B2
(45) Date of Patent: Aug. 3, 2010

(54) METHOD IN PRODUCTION OF PACKAGING LAMINATE

(75) Inventors: Nils Toft, Malmö (SE); Ion Postoaca, Bjärred (SE); Guangju Zuo, Staffanstorp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 982 days.

(21) Appl. No.: 10/553,193

(22) PCT Filed: Mar. 17, 2004

(86) PCT No.: PCT/SE2004/000389

§ 371 (c)(1),
(2), (4) Date: Aug. 28, 2006

(87) PCT Pub. No.: WO2004/089628

PCT Pub. Date: Oct. 21, 2004

(65) Prior Publication Data

US 2007/0017632 A1    Jan. 25, 2007

(30) Foreign Application Priority Data

Apr. 14, 2003    (SE)    ................................. 0301102

(51) Int. Cl.
*B32B 37/00*    (2006.01)

(52) U.S. Cl. ................. 156/272.2; 156/324; 493/51

(58) Field of Classification Search .............. 156/272.6, 156/324; 493/51, 52, 467; 229/100, 124, 229/125.04

See application file for complete search history.

(56) References Cited

U.S. PATENT DOCUMENTS

| | | | |
|---|---|---|---|
| 5,919,517 A * | 7/1999 | Levendusky et al. | 427/211 |
| 6,093,274 A | 7/2000 | Parks et al. | |
| 6,279,779 B1 * | 8/2001 | Laciacera et al. | 222/83 |
| 6,299,787 B1 * | 10/2001 | Li et al. | 216/34 |
| 6,436,547 B1 * | 8/2002 | Toft et al. | 428/474.4 |
| 6,517,657 B1 | 2/2003 | Kuenzel et al. | |
| 2001/0009718 A1 | 7/2001 | Sinsel et al. | |

FOREIGN PATENT DOCUMENTS

| | | |
|---|---|---|
| DE | 1 941 633 | 3/1971 |
| DE | 1 957 591 | 5/1971 |
| DE | 2 040 501 | 2/1972 |

(Continued)

OTHER PUBLICATIONS

Machine Translation of EP 1099544 A2.*

*Primary Examiner*—John L Goff
*Assistant Examiner*—Daniel McNally
(74) *Attorney, Agent, or Firm*—Buchanan Ingersoll & Rooney PC

(57) ABSTRACT

Method in connection with the continuous joining of a first layer (10, 38) of a first material and a second layer (16, 40) of a second material, to produce a packaging laminate (44, 48) comprising said first and second layers. According to the invention, a free surface of said first layer (10, 38) and/or a free surface of said second layer (16, 40) is subjected both to plasma treatment (24) and to flame treatment (20), where after said free surfaces are joined together (12, 14). The invention relates also to a packaging laminate thus produced and to a packaging container manufactured from such a packaging laminate.

9 Claims, 6 Drawing Sheets

FOREIGN PATENT DOCUMENTS

| | | |
|---|---|---|
| DE | 25 07 461 | 9/1976 |
| EP | 044 444 | 1/1982 |
| EP | 522 368 | 1/1993 |
| EP | 0 646 457 A1 | 4/1995 |
| EP | 0 668 157 A1 | 8/1995 |
| EP | 1099544 A2 * | 5/2001 |
| JP | 2000-80188 | 3/2000 |
| JP | 2000-080188 | 3/2000 |
| WO | 92/22521 | 12/1992 |
| WO | 95/32171 | 11/1995 |
| WO | 97/17313 | 5/1997 |
| WO | 98/28253 | 7/1998 |
| WO | 98/29374 | 7/1998 |
| WO | 01/51438 | 7/2001 |
| WO | WO 0185565 A1 * | 11/2001 |
| WO | WO 02/49833 A1 | 6/2002 |

* cited by examiner

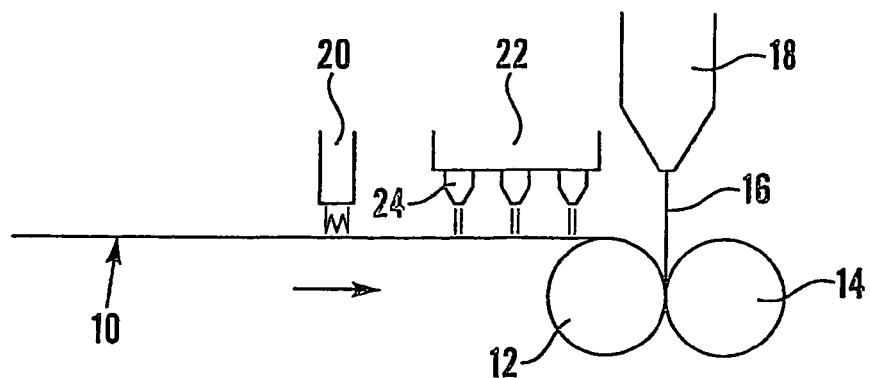
*Fig.1*
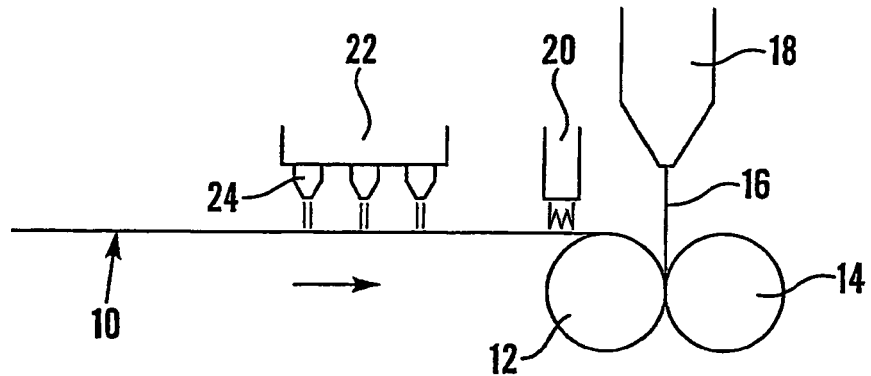
*Fig.2*
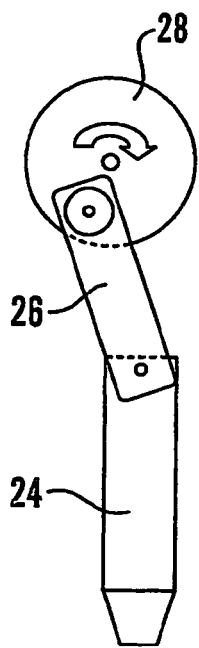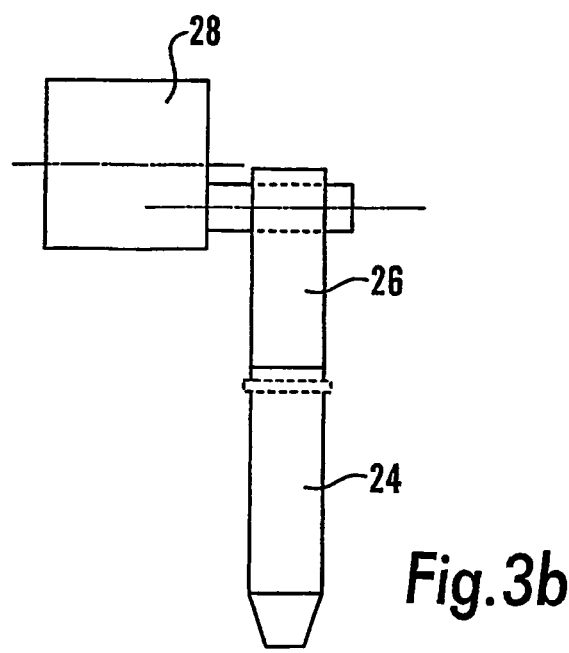
*Fig.3a*          *Fig.3b*

METHOD IN PRODUCTION OF PACKAGING LAMINATE

TECHNICAL FIELD

The present invention relates to a method in connection with the continuous joining of a first layer of a first material and a second layer of a second material, to produce a packaging laminate comprising said first and second layers. The invention also relates to the packaging material thus produced and to a packaging container that is manufactured from the packaging laminate.

PRIOR ART AND PROBLEMS

Packaging containers of the single use disposable type for liquid foods are often produced from a packaging laminate of the type mentioned above. One such commonly occurring packaging container is marketed under the trademark Tetra Brik Aseptic® and is principally employed for liquid foods such as milk, fruit juices etc. The packaging material in this known packaging container is typically a laminate comprising a bulk core layer of paper or paperboard and outer, liquid-tight layers of thermoplastics. In order to render the packaging container light- and gas-tight, in particular oxygen gas-tight, for example for the purpose of aseptic packaging and packaging of fruit juices, the laminate for these packaging containers is normally provided with at least one additional layer, most commonly an aluminum foil, which moreover renders the packaging material thermo-sealable by inductive thermo-sealing which is a rapid and efficient sealing technique for obtaining mechanically strong, liquid- and gas-tight sealing joints or seams during the production of the containers. On the inside of the laminate, i.e. the side intended to face the contents of a container produced from the laminate, there is an outermost layer, applied to the aluminum foil, which outermost, inside layer may be composed of several part layers, comprising adhesives and/or thermoplastics.

Packaging containers are generally produced by means of modern packaging machines of the type that form, fill and seal packages from a web or from prefabricated blanks of packaging material. From a web, for example, packaging containers are produced in that the web is reformed into a tube by both of the longitudinal edges of the web being united to one another in an overlap joint. The tube is filled with the intended liquid food product and is divided into individual packages by repeated transversal seals of the tube at a distance from one another below the level of the contents in the tube. The packages are separated from the tube by incisions in the transverse seals and are given the desired geometric configuration, normally parallelepipedic, by fold formation along prepared crease lines in the packaging material.

It is a general requirement that the different layers of the packaging laminate are well adhered to each other over their entire surfaces facing each other. EP-A-94114184.8 teaches to enhance the surface energy of a first and a second web of plastic material, by subjecting them to corona treatment, plasma treatment or flame treatment, before laminating the webs together to form a laminate material, in order to improve adhesion between the layers of the laminate.

From the consumers point of view, it is also desirable that the packaging container be easy to handle and easy to open when it is time to empty the package of its contents, and in order to satisfy this need, the packaging container is often provided with some type of opening arrangement, with the aid of which it may readily be opened without the need to employ scissors or other implements.

A commonly occurring opening arrangement in such packaging containers includes a hole punched in the core layer of the package wall, the hole being covered on the inside and outside of the package wall, by the respective outer layers of the packaging wall which are sealed to one another in the region of the opening contour of the through hole, thus forming a membrane of the layers not being paperboard (generally denoted Pre-Laminated Hole, PLH). One example of a prior art opening arrangement has a separate pull-tab or opening strip which is applied over the hole and which is rupturably sealed to the outer layer of the outside of the package wall along a sealing joint around the entire opening contour of the hole and at the same time permanently sealed to the outer layer in the region inside the opening contour of the hole. In more advanced opening arrangements, an opening device, usually of moulded plastics, having a pouring spout and a screw top for resealing, is applied onto the region of and around the hole, which opening device is designed to penetrate or remove the membrane within the hole region by a pushing-down or screwing-down movement or, alternatively, to remove the membrane by a screwing- and/or pulling-up movement of the opening device. In the latter kind of opening device, the inside of a screwable part of the opening device is adhered to the membrane of the hole, in such a way that when it is screwed upwards away from the packaging wall, the membrane is lifted along with the screwable part and torn away from the edges of the hole, leaving a practically clean-cut hole for pouring the filled contents out of the package.

In particular, the latter kind of opening arrangement may function similarly to a screw top of a bottle and is often desirable, since it avoids pushing residues of the membrane down through the hole into the package and the filled product.

A precondition for such an opening arrangement to function efficiently and expediently is that, there is adequate adhesion between the different layers of the membrane, in particular between the aluminum foil and the outermost layers on the inside of the laminate, such that the membrane does not delaminate when screwing- and/or pulling-up forces, or forces of screwing and/or pushing-down, are applied to it during the opening operation.

It is generally difficult to obtain such adequate adhesion within the regions of the holes, because of the difference in total laminate thickness between the regions of the holes and the regions outside of the holes when laminating together the aluminum foil and thermoplastic layers of the membrane. When passing a web of the laminated layers through a press nip in a lamination station, the layers are pressed to adhere to each other by means of a pressure roller and a cooled cylinder. In the regions defined by the hole or the slit, the press nip is unable to press the aluminum foil and the polymer layers together sufficiently for achieving the requisite adherence.

Thus, the thickness variations of the core layer may cause that the aluminum foil, which is relatively thin, will not be pressed against and adhered sufficiently well to the surrounding layers of thermoplastics within the whole of the region defined by the hole, which means that air may be entrapped adjacent to the edges of the holes. This in turn means that there may be fracture formations in the aluminum foil, which may lead to the gas-tightness of the packaging container being impaired and thereby also the color, taste and nutritional values of the packaged food product. Furthermore, the integrity of the package may be impaired, which in turn may disturb the aseptic performance of the package.

The air inclusions also result in it being difficult to tear off or penetrate the membrane consisting of the aluminum foil and the polymeric films in the hole or slit, with the ability to open the packaging being restricted and/or with it not being possible to make a clean cut when penetrating, resulting in the formation of frayed edges.

These problems have hitherto been eliminated or at least reduced to an acceptable level, by means of a press roller comprising a metal core with a circular-cylindrical jacket surface, which jacket surface is faced with an inner facing layer consisting of an elastic material, having a first hardness and a first thickness, and arranged on the outside of the inner facing layer, an outer facing layer consisting of an elastic material, having a second hardness and a second thickness, with the first hardness is greater than the second hardness and with the first thickness being greater than the second thickness. Such a press roller has been described in a separate pending application WO 01/02751 by the present applicant.

Another attempt at trying to solve the adhesion problem in a membrane in a hole region for an opening device has been described in WO 01/85565. In WO 01/85565, it is accordingly suggested to improve the adhesion by flame treatment or corona treatment of e.g. the aluminum foil, before lamination. It has however subsequently been found that such a treatment, although giving a certain positive effect on adhesion, is not enough to yield acceptable openability in a commercial packaging container, at least not for certain specific laminates, especially not those adapted for a product that is an aggressive in long term storage.

For the purpose of an opening arrangement as described above, in particular the one functioning by a screw-pulling motion, an outermost, inside heat sealing layer of LDPE is usually bonded to the aluminum foil by means of a bonding layer of an adhesive polymer, such as for example a graft modified polyolefin or a copolymer of ethylene and (met) acrylic acid or a ionomer.

During the latest years, there has been an increasing interest in the use of outermost, inside layers in packaging laminates comprising the kind of ethylene-alfa-olefin copolymers that are polymerized in the presence of a metallocene catalyst, i.e. metallocene polyethylenes (hereinafter denoted as m-PE), which normally are a type of linear low density polyethylenes (m-LLDPE).

Metallocene-polymerised polyethylenes generally have desirable proper-ties like improved tear and puncture resistance, toughness, impact strength, clarity, antiblocking properties and heat sealing performance compared to that of ordinary LDPE. In the manufacturing of packaging containers it would therefore be highly desirable to be able to use m-PE in the outermost, inside sealing layer in order to improve package integrity and sealability properties.

With package integrity is generally meant the package durability, i.e. the resistance to leakage of the packaging container. With sealability properties is meant the ability to heat seal appropriately within a temperature interval or interval of power supply.

Thus, by exchanging the outermost, inside layer of thermoplastics in the above-described packaging laminate from the traditional LDPE to a layer comprising an m-PE in the majority, heat sealability properties as well as package integrity may be improved or, alternatively, maintained at lower amounts of heat sealable polymer.

However, when employing m-PE in the outermost, inside layer of a conventional packaging laminate, instead of the normal LDPE, a considerable deterioration in openability of the opening device appears. Suddenly the membrane breaks between the aluminum foil and the outermost, inside layers of thermoplastics, i.e. between the aluminum foil and the layer comprising an adhesive polymer, due to the screwing and/or pulling movement of the membrane when opening the opening device, such that part of the membrane remains, covering the hole, and impedes the pouring-out of the contents of the package. The problem appears to be caused by insufficient adhesion between the aluminum foil and the adjacent layer of adhesive polymer on the inside of the aluminum foil.

DISCLOSURE OF THE INVENTION

It is, therefore, an object of the present invention to overcome or alleviate the above-described problems.

It is a general object of the invention to provide a packaging laminate with improved internal adhesion between the layers of the laminate. Especially, it is an object to provide a packaging laminate with improved internal adhesion between an aluminum barrier layer and inside layer/layers of thermoplastics.

A further object of the invention is to provide a packaging laminate with improved sealability, having a core layer with punched holes, openings or slits, which provides good openability of a packaging container provided with an opening device, which is arranged to remove the membrane of laminated layers of aluminum foil and thermoplastics from the region of the punched hole in the core layer at the opening operation. Especially, it is an object to provide such a packaging laminate in which the outermost, inside layer comprises m-PE in the main. Also, it is an object to improve the openability by improved internal adhesion in the laminate, without at the same time causing cracks to form in crease lines of the laminate, due to the improved adhesion, when the laminate is fold formed in those crease lines.

Yet a further object of the invention is to provide a packaging laminate having improved sealability properties for the purpose of manufacturing an aseptic, gas-tight packaging container, having improved or maintained package integrity, the packaging container being provided with an opening device, which is arranged to remove the membrane of laminated layers of aluminum foil and thermoplastics from the region of the punched hole in the core layer at the opening operation.

These objects are attained according to the present invention by the method, the packaging laminate and the packaging container as defined in the appended claims.

These objects are thus attained according to the present invention by a method in connection with the continuous joining of a first layer of a first material and a second layer of a second material, to produce a packaging laminate comprising said first and second layers, in which method a free surface of said first layer and/or a free surface of said second layer is subjected both to plasma treatment and to flame treatment, where after said free surfaces are joined together.

Although it is previously known to use either plasma treatment or flame treatment to improve internal adhesion within a packaging laminate, it has now very much surprisingly been found that the adhesion can be even further improved by a combined plasma and flame treatment, the one preceding the other, before lamination of the layers to form the laminate. A working theory, which is not to restrict the invention, is that although both treatments result in enhanced surface energies, they give different functional groups on the surface that is treated, which in turn gives more points of adhesion and accordingly improved over-all adhesion as compared to when only one of the treatment methods is used.

Even more surprisingly, it has been found that openability is improved the most when plasma treatment precedes flame treatment. Not even a working theory can at the moment be presented regarding this truly surprising result.

The flame treatment, and optionally also the plasma treatment, is performed over essentially the entire free surface of said first and/or said second layer, said first and/or second layers extending throughout the laminate that is produced. It is however also conceivable, in order to reduce the risk of cracks in the crease lines when the laminate is fold formed in the crease lines, to perform the plasma treatment locally, at regions for said through holes, said plasma treatment preferably being performed intermittently on a continuously running web comprising said first or second layer. By performing the plasma treatment locally, i.e. only at the through holes in the bulk layer, on the layer covering these holes, the adhesion will locally be very high at these holes, while the adhesion at the crease lines is lower, but still improved due to the flame treatment. It is even possible to plasma treat a section of the web that is more narrow than the diameter of the holes, due to the fact that delamination of the membrane covering the holes normally is induced centrally. Another option is to plasma treat a continuous strip of the web, in which strip said holes are located. The plasma treated strip may be more narrow than the diameter of the holes, slightly wider than the diameter of the holes, or it may be of substantially the same width as the diameter of the holes.

The plasma treatment is preferably based on air only, i.e. essentially no other gas being used. Hence, it is preferred that essentially no ozone is formed. The flame treatment is based on combustion in air of a combustible gas.

According to one aspect of the invention, the treatment is performed on a continuously running web of the first layer which is preferably aluminum foil that is already joined with a bulk core layer of the laminate, optionally being provided with pre-punched holes for opening devices, and outermost, outside layer or layers comprising a décor layer. Preferably, the bulk core layer is a paper or paperboard layer.

It is preferred that the flame treatment precedes the plasma treatment although it has been found that the adhesion may be improved also when the order is the reverse. In any case, it is preferred that both treatment steps are performed in direct connection with the lamination of the treated layer with a second layer, i.e. directly before the lamination.

Preferably, said lamination is performed in a laminating station in which the inside layer/layers of the laminate is/are extruded/co-extruded into a nip where the joining of the first, treated layer and the second, extruded layer(s) takes place.

According to another aspect of the invention, the inside layers comprise an outermost layer comprising in the majority an ethylene—α-olefin copolymer, polymerised in the presence of a metallocene catalyst, a so called metallocene polyethylene (m-PE). Most preferably, the laminate is provided with an inside layer structure comprising three part-layers respectively comprising adhesive polymer, LDPE and m-PE in this order, whereby an improvement in sealability and package integrity qualities is obtained as well as required openability properties, for the purpose of a packaging container having an opening device, which at opening removes the membrane of laminated layers of aluminum foil and thermoplastics from the region of a hole in the core layer, made previous to lamination.

Preferably, the second intermediate part-layer is extruded at a higher temperature than the first and third part-layers. By doing so, heat will be transferred from the second part-layer to the first adhesive part-layer and the effect above will be increased further. Preferably, the third, outermost, inside, part-layer should be extruded at a temperature as low as possible, e.g. 260-280° C., in order to avoid that possible trace substances from polymer degradation, due to high temperature influence on the polymer melt, are released and migrating into the filled contents of the package, i.e. to avoid so called problems of "off-taste" in the filled food product. The second intermediate part-layer of LDPE is co-extruded with the first and third part-layers at a higher temperature of about 265-320° C., preferably at about 265-300° C. It is the improved adhesion due to the invention that enables the lower temperature range to be used, which is beneficial in terms of "off-taste" problems. If the invention was not used, the second intermediate part-layer of LDPE would have to be co-extruded with the first and third part-layers at the upper part of the first mentioned temperature range, and still the adhesion would not be as good as the case when the treatment according to the invention is used.

DESCRIPTION OF PREFERRED EMBODIMENTS

In the following, preferred embodiments of the invention will be described with reference to the drawings, of which:

FIG. 1 is schematically showing a preferred treatment line for a continuously running web, in which flame treatment precedes plasma treatment, FIG. 2 is schematically showing another embodiment of a treatment line for a continuously running web, in which plasma treatment precedes flame treatment, FIG. 3a-b is showing a plasma jet device adapted for intermittent treatment of the web, FIG. 4 is showing, in cross-section, a first embodiment of a packaging laminate produced according to the invention, FIG. 5 is showing, in cross-section, a second embodiment of a packaging laminate produced according to the invention, FIG. 6 is showing a packaging container formed from a packaging laminate according to the invention and provided with an opening arrangement.

Figure 4:
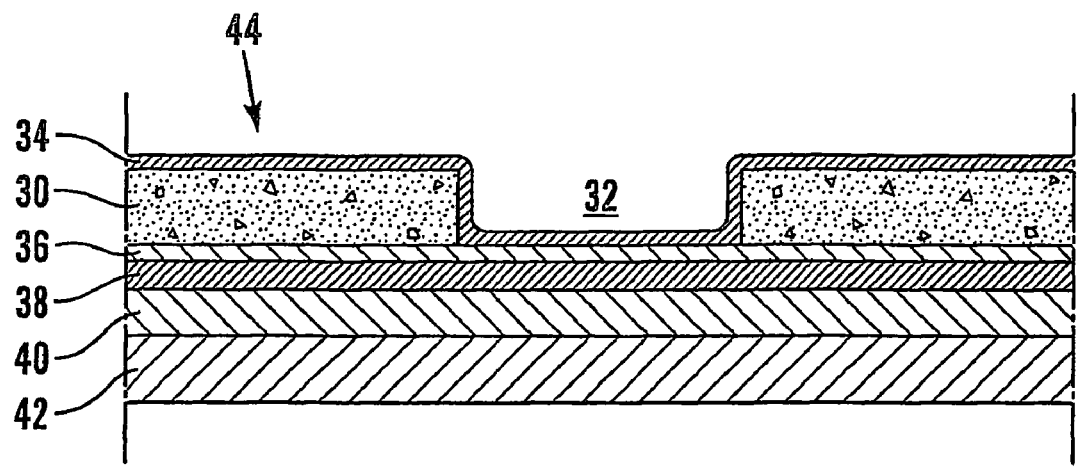

In FIG. 1, a web 10 of aluminum foil/adhesive/paperboard/décor layer, in this order as seen from the top, is lead to a nip between two rolls 12 and 14 in a lamination station. The lamination station also comprises an extruder 18 that extrudes a film 16 of a single polymeric layer or two or more polymeric layers, which in that case are co-extruded, into the nip. In the nip, the web 10 and the film 16 are joined to one another over essentially their free surfaces facing each other.

Just prior to the lamination, the web 10, or more specifically its upper free aluminum foil surface, is subjected to flame treatment 20, by which the surface is activated. The flame treatment 20 is performed over the entire, or essentially the entire width of the web 10. Immediately after the flame treatment, while the surface of the web is still activated and before entering the nip, the web 10 is subjected to plasma treatment 22, by which the surface is activated even more and in a different manner.

In the shown, preferred embodiment, the plasma treatment device 22 is constituted by a rig that holds several individual plasma jets nozzles 24 for spot-wise treatment, here three nozzles but the number of nozzles may be anything from one or two to ten or even more. The nozzles operate intermittently and at each discrete time interval the web may be treated at a number of locations equal to the number of jets 24.

FIG. 2 corresponds to FIG. 1, only differing in that the plasma treatment 22 precedes the flame treatment 20.

In FIG. 3a-b, there is shown one possible way of arranging the plasma jet nozzles 24 to operate intermittently on the web 10. Actually, the nozzle 24 is in operation all the time, but it is arranged to be mechanically displaced out of operational engagement with the web 10, by the nozzle 24 being pivotably attached to a shank 26 which in turn is pivotably attached to a rotating disc 28, off-center of the same. Of course, many other mechanical arrangements are conceivable for the periodic bringing out of operational range of the continuously operating nozzle 24. Another method of achieving intermittent plasma treatment is to control the nozzles to be switched on and off, in which case it is beneficial to have a greater number of nozzles 24 in the rig, such that the time intervals for switching on and off may be longer.

In FIG. 4, there is shown, in cross-section, a first embodiment of a packaging laminate 44 produced according to the invention. The laminate comprises a bulk core layer 30, normally of paperboard. A hole 32 has been punched in the bulk layer 30, which hole is intended for the mounting of an opening device, such as a screw top e.g. (not shown). An outermost, outside layer 34 comprises a décor layer of a thermoplastic material, which extends over the hole 32. On the opposite side of the bulk layer 30, there is arranged an adhesive layer 36, an aluminum foil 38 and an outermost, inside layer which in this case consists of two (co-extruded) layers 40 and 42 of thermoplastic material. Layers 34, 30, 36 and 38 constitute the web 10 in FIGS. 1 and 2, and the aluminum foil 38 constitutes the first layer according to the invention, which first layer is flame and plasma treated. The second layer according to the invention is the thermoplastic layer 40, which preferably is composed of a polyethylene material such as low density polyethylene (LDPE), ethylene acrylic acid (EAA) or ethylene metacrylic acid (EMAA), depending on the application of the laminate 44. It is also conceivable to use ionomers, e.g. Surlyn (trade namn). The outermost, inside layer 42, i.e. the layer that will be in contact with the product filled into the packaging container to be produced from the laminate 44, is preferably composed of a polyethylene material such as low density polyethylene (LDPE) and even more preferred a polyethylene material comprising in the majority metallocene polyethylene (m-PE). In the case that both layers 40 and 42 are composed of, optionally different types of, polyethylene material, it is for off-taste reasons preferred that the outermost layer 42 is extruded at a lower temperature than the layer 40 that is to be joined directly with the aluminum foil 38. The layers 40 and 42 constitute the film 16 in FIGS. 1 and 2.

Figure 5:
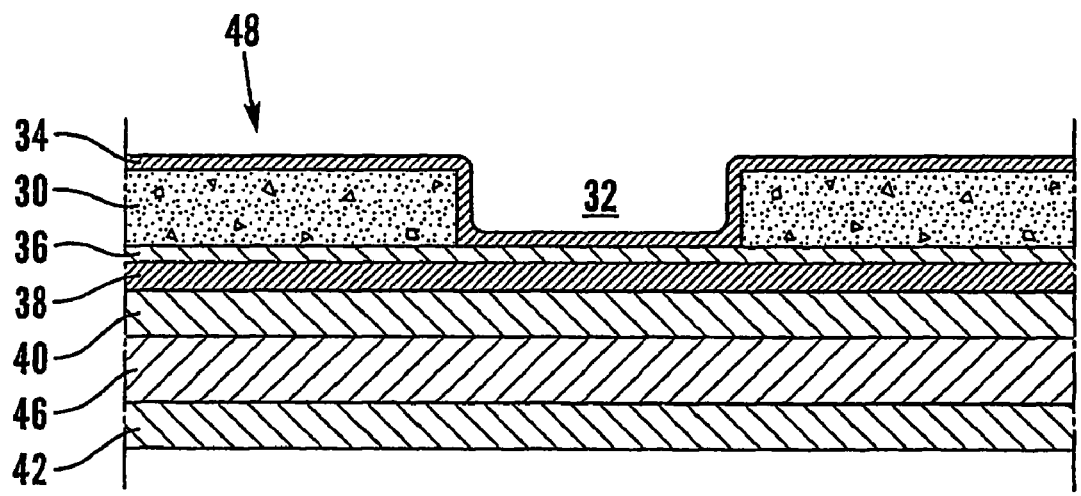

In FIG. 5, there is shown, in cross-section, a second embodiment of a packaging laminate 48 produced according to the invention. The laminate 48 corresponds to the laminate 44 in FIG. 1, with the exception that the inside layer structure of the laminate 48 comprises three part-layers respectively comprising adhesive polymer 40, LDPE 46 and m-PE 42. The adhesive polymer 40 is preferably ethylene acrylic acid (EAA) or ethylene metacrylic acid (EMAA). The layer 42 that in the majority comprises m-PE is extruded at a lower temperature than the layer 46 of LDPE. The layer 46 may however be composed of some other thermoplastics or quality of PE. Preferably the inside layers 40, 46 and 42 have been co-extruded as a film 16 according to FIGS. 1 and 2.

Figure 6:
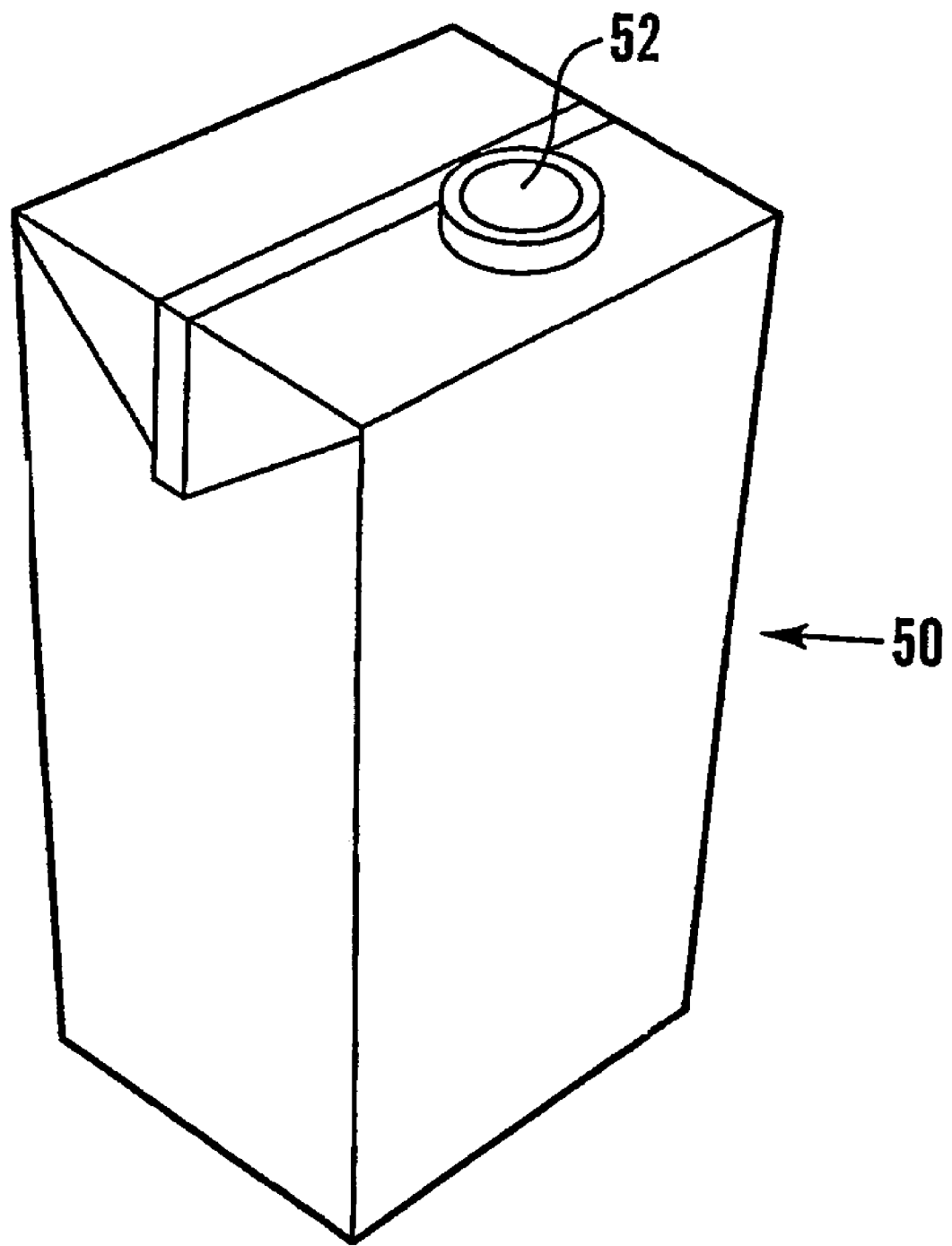

Referring to FIG. 6, a typical aseptic package 50 of the type Tetra Brik Aseptic® is provided with an opening arrangement 52 as described above. The hole with the membrane is provided at the top of the packaging container and there is attached an opening device 52 of moulded plastics onto the membrane over the hole, which opening device consists of a frame and a screw top threaded into it. The opening device may be further provided with a so called tampering evidence, the position of which indicates if the packaging container has been opened or not.

EXAMPLE 1

A series of tests were performed on adhesion and openability for a membrane covering a pre-punched hole in three types of laminates having different inside structures. In the first test series, which were performed on a pilot plant, the inside thermoplastic structure consisted of LDPE/m-PE and in the second test series, which were performed on a pilot plant, the inside thermoplastic structure consisted of EAA/m-PE. In all cases, the aluminum foil to be joined with the inside structure was treated with plasma and/or flame. The relative results on adhesion and openability are shown in Table 1.

TABLE 1

|  | LDPE/m-PE adhesion openability | EAA/m-PE adhesion openability |
| --- | --- | --- |
| Plasma | ++ | + |
|  | n.t. | n.t. |
| Flame | + | + |
|  | n.t. | n.t. |
| Plasma + flame | n.t. | ++ |
|  | n.t. | +++ |
| Flame + plasma | n.t. | +++ |
|  | n.t. | + | n.t. = not tested

As can be seen, for the laminate having a EAA/m-PE inside structure, both adhesion and openability were greatly improved by the combination of plasma and flame treatment. Moreover, it seemed that while the adhesion was improved the most when the flame treatment preceded the plasma treatment, the open-ability was improved the most when the plasma treatment preceded the flame treatment. More specifically, while 150 of 150 packages exhibited virtually no openability when no treatment was conducted at all, 97 of 150 packages exhibited very good openability and 21 of 150 exhibited good openability when plasma treatment preceded flame treatment, the remaining 32 of 150 still being difficult to open. When flame treatment preceded plasma treatment, 21 of 150 packages exhibited very good openability and 23 of 150 exhibited good openability, the remaining 106 of 150 still being difficult to open.

EXAMPLE 2

A test series was made in pilot scale to produce PLH packaging materials by alternative techniques intended to increase long-term adhesion between aluminum foil and inside layers of the packaging materials, and to improve the openability for the caps that were positioned in the holes in the packages made from the packaging materials. The packages made from the packaging materials were filled with an aggressive product.

The following packaging materials, treated in different ways, were investigated:

Pre-made inside: The inside layers were pre-made together with the aluminum foil. Then the pre-made layers were laminated with paperboard with pre-made holes, and décor layer. The intention was to decrease air entrapment in the area of the holes.

Doubl. Adh.: A doubled amount of adhesive polymer was used for the first inside part-layer, in order to increase adhesion and resistance to migration of free fatty acids in the aggressive product.

Flame/plasma: According to the present invention. A packaging material with an inside of three part-layers according to FIG. 5 (whereof the inside layer in contact with the product was m-PE). The aluminum foil was treated by flame over the entire web and the area of the hole zones was treated by plasma.

Reference mPE: This material was the reference for the Flame/plasma material, i.e. the same material but without flame and plasma treatment.

Laq. foil: The material was manufactured by using a lacquered aluminum foil for increasing adhesion and openability. Three inside part-layers were used according to FIG. 5 (whereof the inside layer in contact with the product was m-PE).

Novex: Three inside part-layers were used (whereof the inside layer in contact with the product was m-PE), but the middle part-layer was changed from LDPE to Novex in order to increase resistance to fatty acids.

Reference LDPE: This material was the reference concerning a packaging material with an inside with two part-layers of LDPE.

Figure 7:
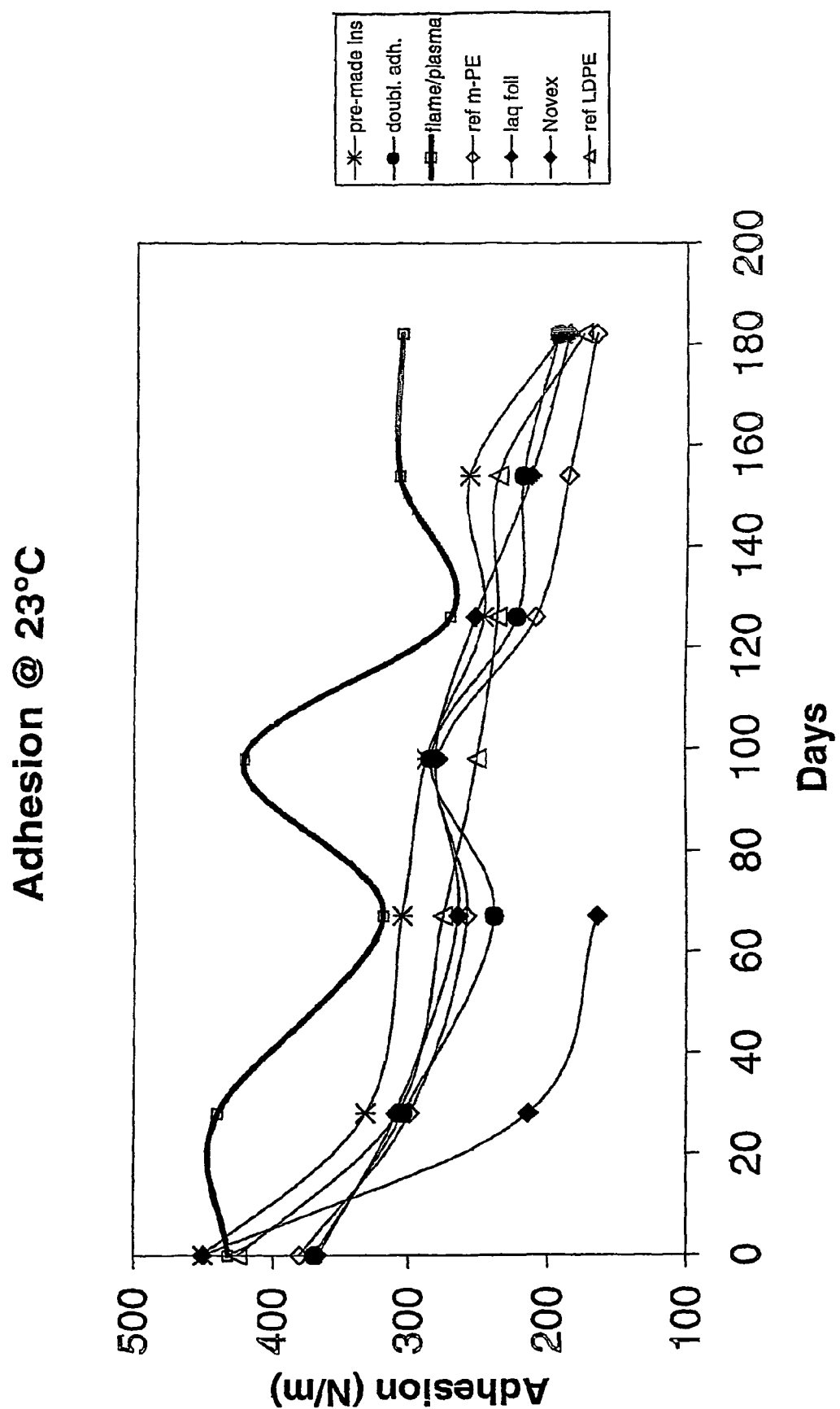
FIG. 7 is a diagram showing a comparison of adhesion properties for different types of packaging materials, stored at 23° C. for 6 months.
Figure 8:
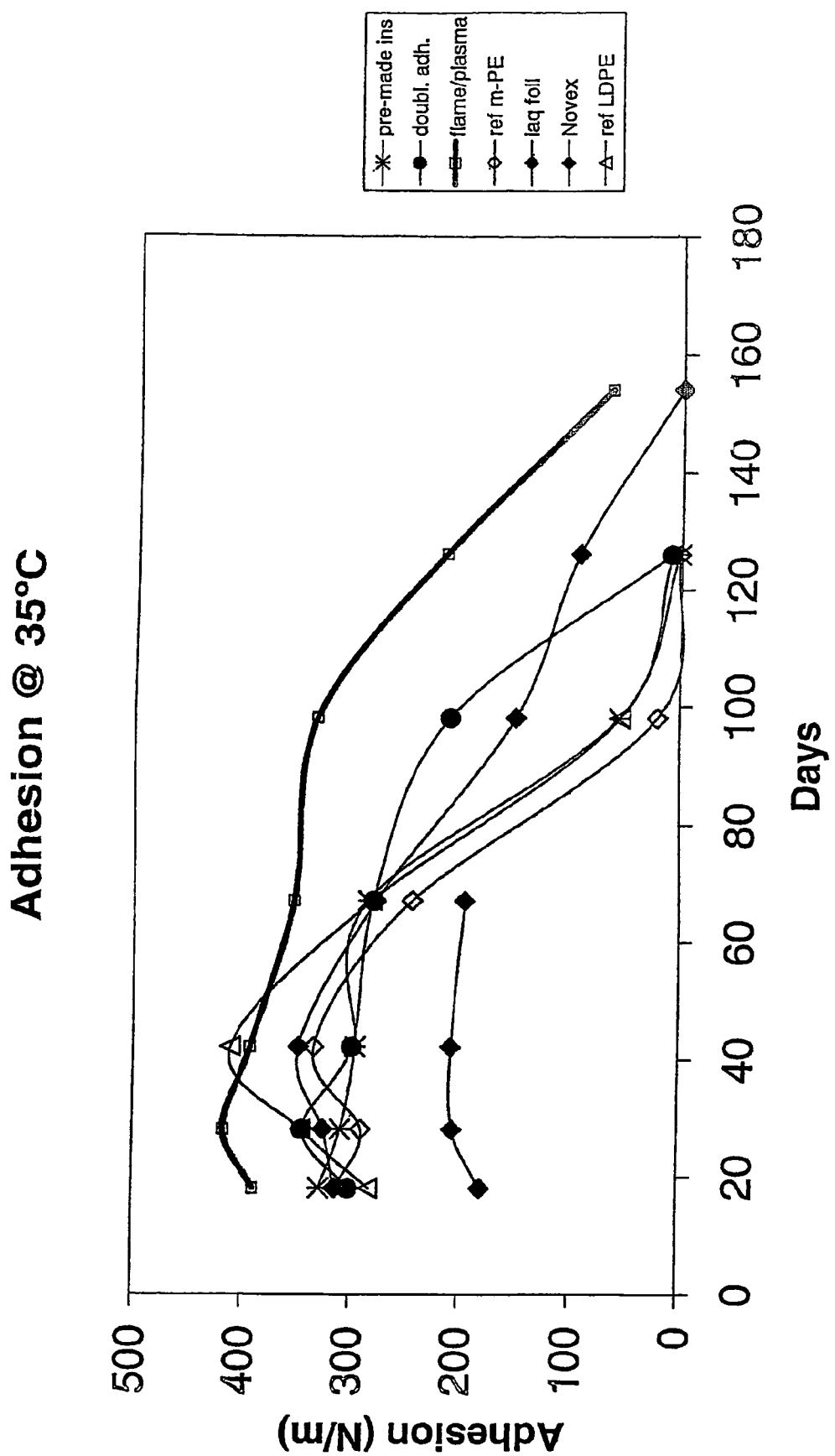
FIG. 8 is a diagram showing a comparison of adhesion properties for different types of packaging materials, stored at 35° C. for 6 months.
Figure 9:
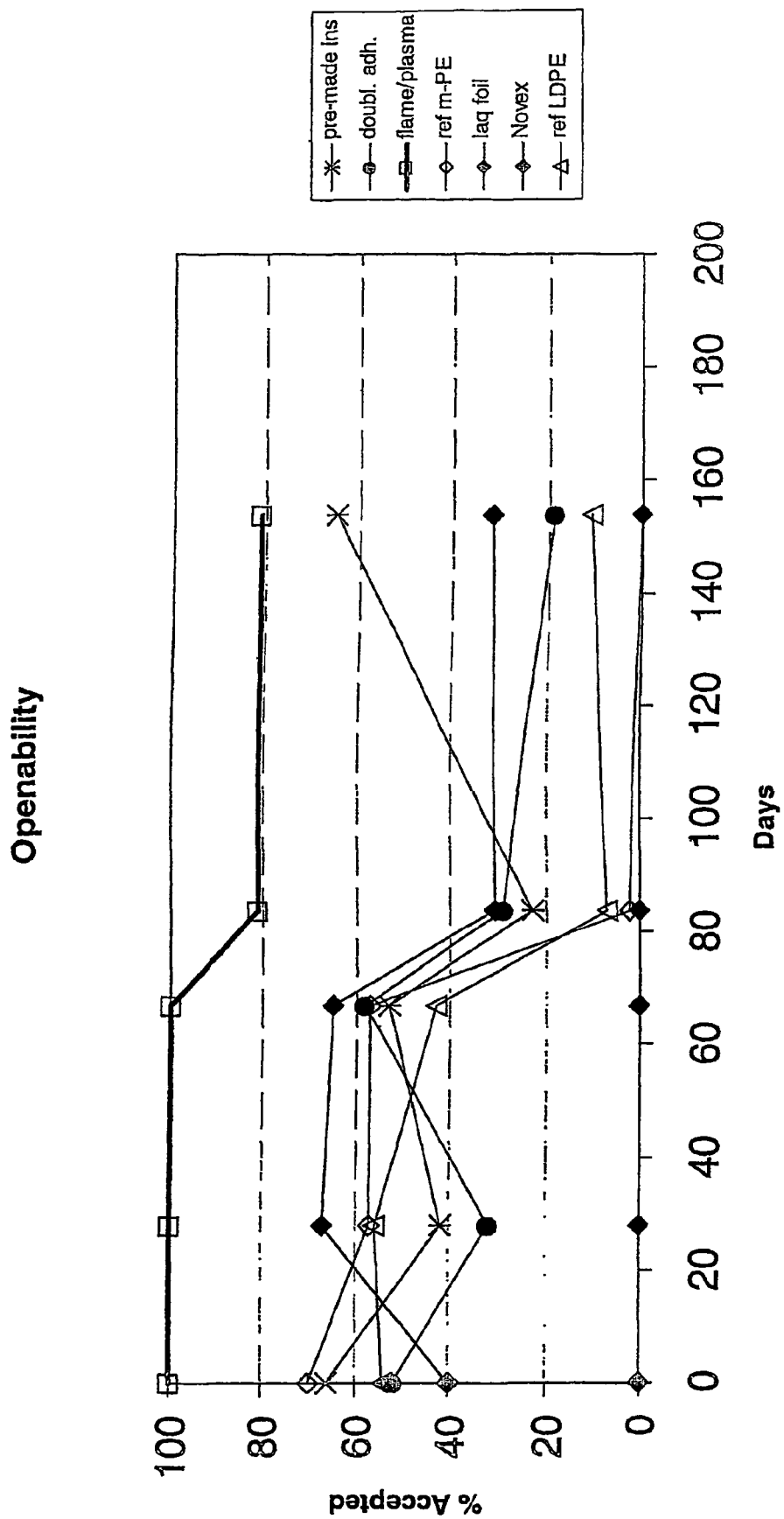
FIG. 9 is a diagram showing a comparison of openability for different types of packaging materials, stored for 6 months.

The results are shown in FIG. 7-9. As can be seen, the packaging material treated by combined flame and plasma treatment provided both the strongest adhesion and the best openability during the test period of 6 months.

The invention is not limited by the embodiment shown and described above, but may be varied within the scope of the claims. It is for example to be understood that the plasma treatment device may be arranged to provide a plasma jet over the entire, or essentially the entire width of the web and that the plasma treatment device in that case operates continuously, such that essentially the entire free surface of the web is treated by plasma. If, on the other hand, a spot-wise arranged plasma jet nozzle is run continuously, a strip of the web may be treated. Furthermore, it is to be understood that the layer to be flame and plasma treated may be composed of another material than aluminum and that both layers to be joined may be flame and plasma treated according to the invention. Of course, it is also understood by the above that merely a local plasma treatment at the membranes covering the holes for opening arrangements, i.e. without any flame treatment, could be beneficial for adhesion and/or openability, such a concept however not being included here.

The invention claimed is:

1. Method in connection with the continuous joining of a first layer of aluminum and a second layer of a different material, to produce a packaging laminate comprising said first and second layers, the method comprising: subjecting a free surface of at least said first layer of aluminum to both plasma treatment and flame treatment; joining together said free surface of the first layer of aluminum with a free surface of the second layer after the flame treatment and the plasma treatment; joining the first layer, before the flame treatment and the plasma treatment, with a bulk layer of paper or paperboard, on a side of the first layer opposite to the free surface of the first layer, the bulk layer exhibiting though holes, openings or slits covered by a membrane comprising the first layer of aluminum; the plasma treatment being performed locally, only at regions of the through holes, openings or slits, the plasma treatment being performed intermittently on a continuously running web comprising the first layer.

2. Method according to claim 1, wherein said second layer is a film of adhesive material or thermoplastics, which is co-extruded, before said treatment, together with a third, thermoplastic layer to form an outermost layer on the inside of the packaging laminate, said third layer being a polyethylene layer.

3. Method according to claim 2, a fourth, intermediate layer of low density polyethylene being arranged between said second layer and said third layer said second, third and fourth layers being co-extruded with one another, before said treatment.

4. Method according to claim 2, wherein the third layer is a polyethylene layer comprising in the majority metallocene polyethylene.

5. Method according to claim 1, wherein said plasma treatment is performed before said flame treatment.

6. Method according to claim 1, wherein said flame treatment is performed before said plasma treatment.

7. Method according to claim 1, wherein said flame treatment is performed over essentially the entire free surface of said first and/or said second layer, said first and/or second layers extending throughout the laminate that is produced.

8. Method according to claim 1, wherein said plasma treatment is performed intermittently and locally for all of the through holes, openings or slits in the bulk layer.

9. Method according to claim 1, wherein said first layer is an aluminum foil layer.

* * * * *